United States Patent
Lee

(10) Patent No.: US 6,652,146 B2
(45) Date of Patent: Nov. 25, 2003

(54) LINEAR MOTION GUIDE DEVICE HAVING TWO OFFSET BALL ROWS

(76) Inventor: Mouton Lee, No. 10, Fu Hsin Road, Tu-Chern City, Taipei Hsien (TW), 236

(*) Notice: Subject to any disclaimer, the term of this patent is extended or adjusted under 35 U.S.C. 154(b) by 63 days.

(21) Appl. No.: 10/109,100

(22) Filed: Mar. 29, 2002

(65) Prior Publication Data

US 2003/0185470 A1 Oct. 2, 2003

(51) Int. Cl.$^7$ .............................................. F16C 29/06
(52) U.S. Cl. ........................................... 384/45; 384/51
(58) Field of Search ............................ 384/43, 44, 45, 384/47, 49, 51

(56) References Cited

U.S. PATENT DOCUMENTS

| | | | | |
|---|---|---|---|---|
| 206,648 A | * | 7/1878 | Tucker | 384/47 |
| 4,729,669 A | * | 3/1988 | Walter et al. | 384/45 |
| 5,755,516 A | * | 5/1998 | Teramachi et al. | 384/45 |
| 5,947,605 A | | 9/1999 | Shirai | 384/45 |

* cited by examiner

Primary Examiner—Thomas R. Hannon
(74) Attorney, Agent, or Firm—Charles E. Baxley

(57) ABSTRACT

A bearing is to be engaged between two or more machine elements, and includes an endless ball chain, and two offset rows of balls engaged in the endless ball chain, for forming an endless planer structure to resist the forces transmitted between the machine elements. The endless ball chain includes a number of spacers disposed between the balls and each having one or more notches for increasing a deformability of the spacers, and has two side flanges and an intermediate flap. The spacers are solidly formed and disposed between the side flanges and the intermediate flap.

7 Claims, 4 Drawing Sheets

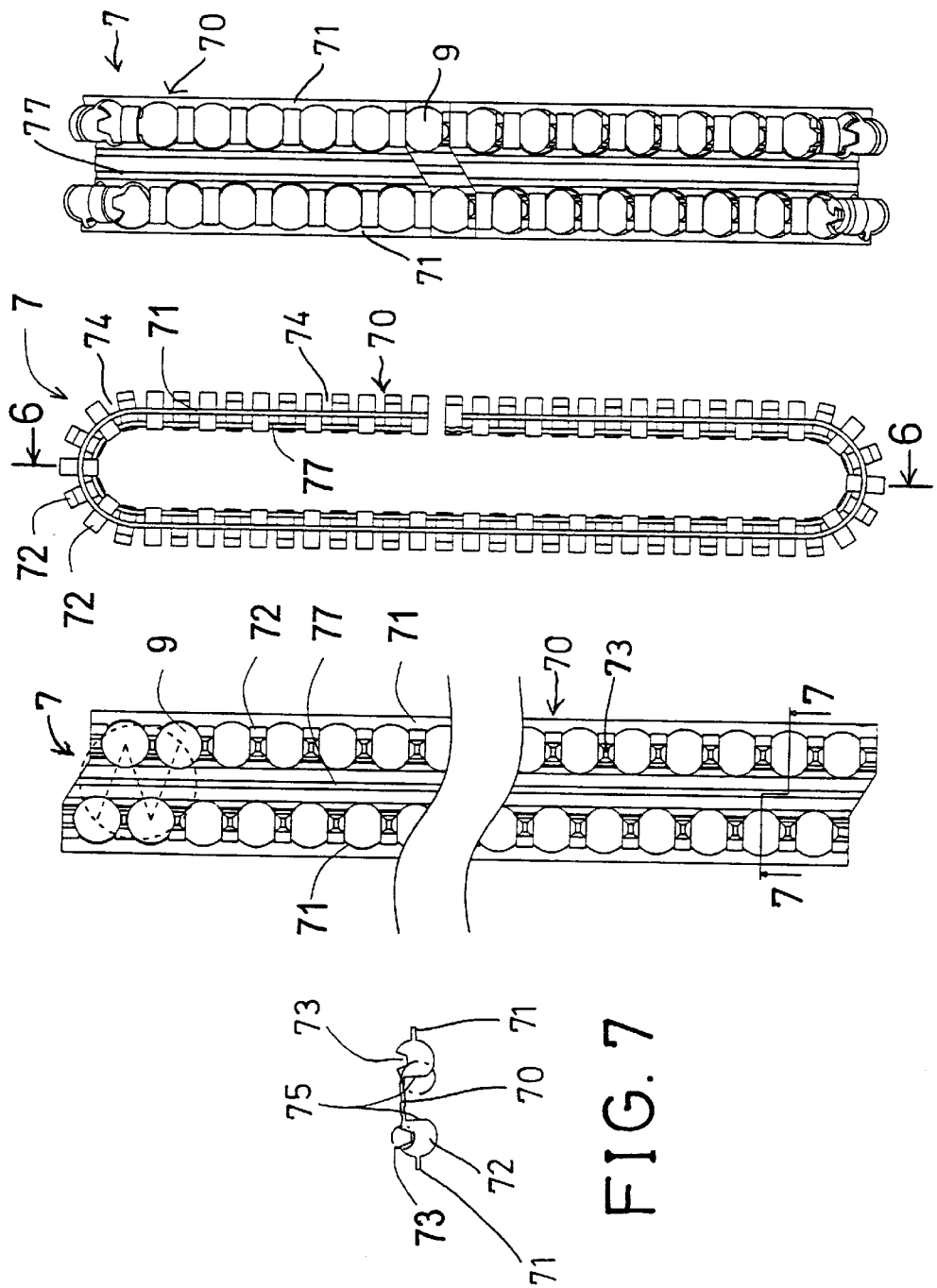

LINEAR MOTION GUIDE DEVICE HAVING TWO OFFSET BALL ROWS

BACKGROUND OF THE INVENTION

1. Field of the Invention

The present invention relates to a linear motion guide device, and more particularly to a linear motion guide device having two offset rows of balls.

2. Description of the Prior Art

Typical machine devices may include one or more bearing devices or linear motion guide devices engaged between the machine elements for facilitating the moving or the sliding between the machine elements. U.S. Pat. No. 5,947,605 to Shirai discloses one of the typical linear motion guide apparatuses equipped with a plurality of rows of ball chains. However, the typical linear motion guide devices may not be used in the heavy duty machine devices for resisting the great forces or torques that may be transmitted between the machine elements of the machine devices. The ball row chain includes a number of spacer members secured together on or along a single connection member. The spacer members may not stably hold the balls in place such that the balls may be easily disengaged from the spacer members. In addition, the balls may be forced to act onto the spacer members while the balls and the ball row chain are rotated or turned relative to the machine parts.

The present invention has arisen to mitigate and/or obviate the afore-described disadvantages of the conventional linear motion guide devices for machine members.

SUMMARY OF THE INVENTION

The primary objective of the present invention is to provide a linear motion guide device including two offset rows of balls for resisting the great forces or torques that may be transmitted between the machine elements of the machine devices.

The other objective of the present invention is to provide a linear motion guide device including two offset rows of balls for being stably and solidly secured between the machine elements of the machine devices.

In accordance with one aspect of the invention, there is provided a linear motion guide device comprising an endless ball chain including two rows of openings formed therein and offset from each other, and including a plurality of spaces provided between the openings thereof, and two rows of balls engaged in the openings of the endless ball chain and engaged between the spacers and offset from each other. The offset of the two rows of balls allows the two rows of balls to be moved, one by one, across the turning portion between two machine elements.

The spacers each includes at least one notch formed therein for increasing a deformability of the spacers. The formation or the provision of the notches in the spacers may increase the deformability of the spacers, particularly when the spacers are squeezed by the balls and/or by the machine elements. The grease or the lubrication oil may be suitably retained between the balls that are offset from each other.

The endless ball chain includes two side flanges and an intermediate flap, the spacers are formed between the side flanges and the intermediate flap of the endless ball chain.

Further objectives and advantages of the present invention will become apparent from a careful reading of a detailed description provided hereinbelow, with appropriate reference to accompanying drawings.

BRIEF DESCRIPTION OF THE DRAWINGS

FIG. 4 is a plan view illustrating a ball chain of the linear motion guide device;

FIG. 5 is a side view of the ball chain as shown in FIG. 4;

FIG. 6 is a partial cross sectional view taken along lines 6—6 of FIG. 5; and

FIG. 7 is a partial cross sectional view taken along lines 7—7 of FIG. 6.

DETAILED DESCRIPTION OF THE PREFERRED EMBODIMENT

Figure 1:
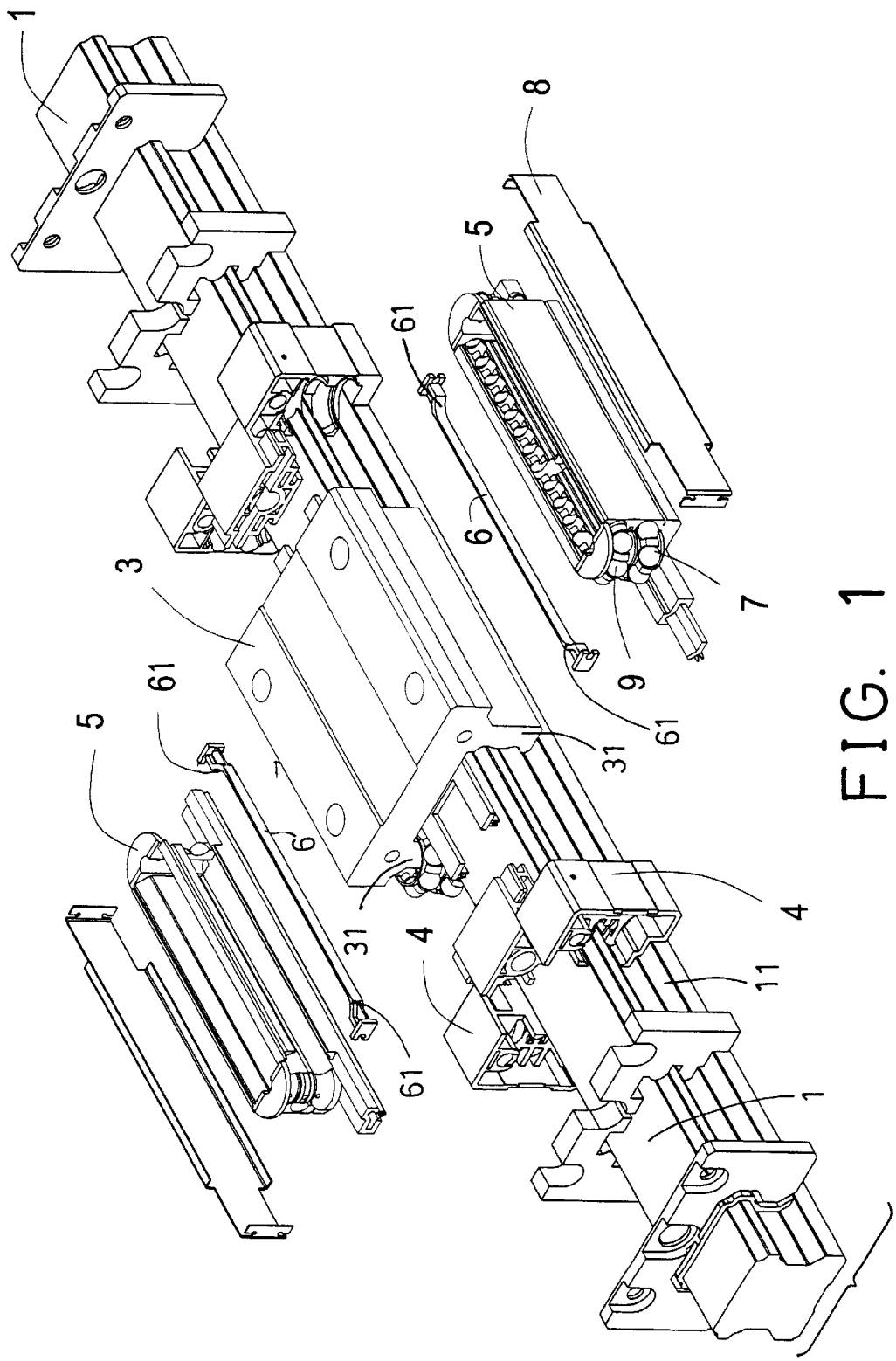
FIG. 1 is an exploded view of a linear motion guide device in accordance with the present invention.
Figure 2:
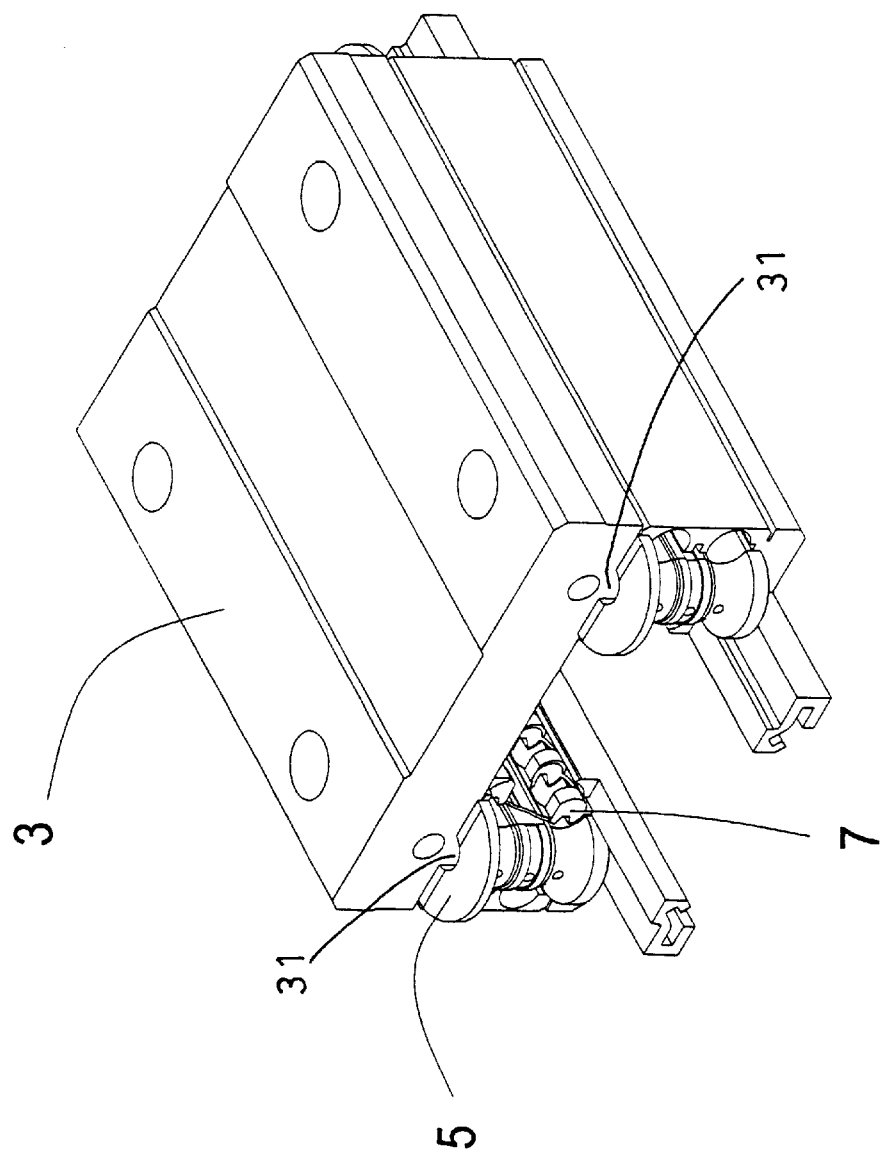
FIG. 2 is a partial perspective view of the linear motion guide device.
Figure 3:
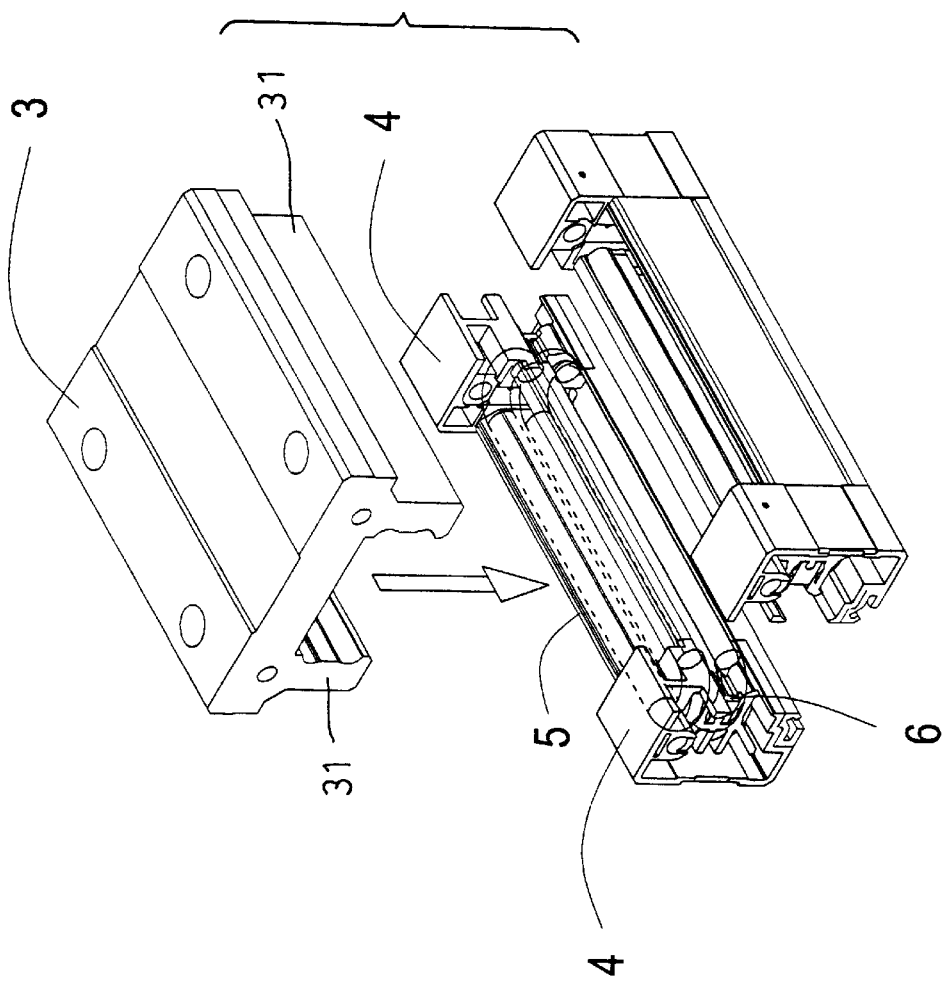
FIG. 3 is a partial exploded view of the linear motion guide device as shown in FIG. 2.

Referring to the drawings, and initially to FIGS. 1–3, a linear motion guide device in accordance with the present invention comprises one or more bearing devices 7 to be attached and secured between two or more machine elements of a machine device. For example, the machine device includes a track rail 1 having one or more channels 11 formed in each of two sides thereof, and a housing 3 slidably engaged onto the track rail 1 and having one or more bars 31 extended therefrom and located beside the channels 11 of the track rail 1. The bearing devices 7 are attached onto the bars 31 with such as frames 5 respectively, and engaged between the track rail 1 and the bars 31 of the housing 3. One or more guide beams 6 and one or more outer boards 8 may further be attached onto the frame 5 for further stably securing the bearing devices 7 to the housing 3. One or more casings 4 may be secured to the ends of the housing 3 for stably retaining the bearing devices 7 in the housing 3.

As shown in FIGS. 4–7, the bearing device 7 includes an endless ball chain 70 having two rows of openings 74 formed therein, such as formed between two side flanges 71 and an intermediate flap 77, for receiving two rows of balls 9 therein, or for receiving rollers (not shown) therein, and for allowing the balls 9 to be arranged an endless planer structure. The endless ball chain 70 further includes a number of discs or panels or spacers 72 formed and provided between the openings 74 thereof, and engaged between or with the balls 9, and each having one or more notches 73 formed therein, such as formed in the outer peripheral portion thereof for increasing the deformability of the spacers 72, and for allowing the spacers 72 to be depressed or squeezed by the balls 9 without being greatly deformed and damaged. The spacers 72 may be stably and solidly formed and provided between the side flanges 71 and the intermediate flap 77 of the endless ball chain 70.

It is to be noted that the two rows of balls 9 are offset from each other; i.e., the two rows of balls 9 are not arranged side by side, best shown in FIGS. 4, 6, for allowing the balls 9 to be suitably provided and engaged between the track rail 1 and the housing 3. In addition, as best shown in FIG. 1, when the endless ball chain 70 is rotated relative to the bars 31 of the housing 3, particularly is turning relative to the bars 31 of the housing 3, the two rows of balls 9 will move across the turning portion relative to the bars 31 of the housing 3 one by one, and the two rows of balls 9 will not be moved across the turning portion relative to the bars 31 of the housing 3 simultaneously. Furthermore, the grease or the lubrication oil may be suitably retained between the balls 9.

The non-circular spacers 72 may facilitate the disengagement of the endless ball chain 70 from the mold devices that are provided for molding and manufacturing the endless ball chain 70.

In operation, as shown in FIGS. 1–3, the bearing device 7 includes two rows of openings 74 and two rows of balls 9 engaged between the track rail 1 and the bars 31 of the housing 3, such that the bars 31 of the housing 3 are in plane engagement with the track rail 1 and may be stably and slidably or movably secured to the track rail 1 and may be prevented from oscillating or vibrating relative to the track rail 1, and may be used for resisting the great forces or torques that may be transmitted between the track rail 1 and the bars 31 of the housing 3. The formation or the provision of the notches 73 in the spacers 72 may increase the deformability of the spacers 72, particularly when the spacers 72 are squeezed by the balls 9 or the rollers and/or by the track rail 1 and the housing 3. The grease or the lubrication oil may be suitably retained between the balls 9 that are offset from each other. In addition, the offset of the two rows of balls 9 allows the two rows of balls 9 to be moved across the turning portion relative to the bars 31 of the housing 3 one by one.

The lubrication oil may be retained in the notches 73 of the spacers 72 for lubricating the balls 9. The spacers 72 each includes one or more cut-off portions 75 for facilitating the disengagement of the endless ball chain 70 from the mold devices. The end portions of the ball chain 70 include a bent or non-linear structure (FIG. 6) for allowing the ball chain 70 and the balls 9 to be easily rotated around the bars 31 of the housing 3. The balls 9 may be the other rotary members, such as the rollers. etc. The guide beams 6 each has two curved end portions 61 (FIG. 1) for guiding the balls 9 and the ball chain 70 to rotate around the bars 31.

Accordingly, the linear motion guide device includes a bearing device having two offset rows of balls for resisting the great forces or torques that may be transmitted between the machine elements of the machine devices; and for being solidly secured between the machine elements of the machine devices.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A linear motion guide device comprising:

an endless ball chain including two side flanges and an intermediate flap, and including at least two rows of openings formed between said side flanges and said intermediate flap and offset from each other and including a plurality of spacers provided between said at least two rows of openings thereof, and at least two rows of balls engaged in said at least two rows of openings of said endless ball chain and engaged between said spacers and offset from each other.

2. The linear motion guide device according to claim 1, wherein said spacers each includes at least one notch formed therein for increasing a deformability of said spacers.

3. The linear motion guide device according to claim 2, wherein said at least one notches of said spacers are provided for receiving lubricating oil.

4. The linear motion guide device according to claim 1, wherein said spacers each includes at least one cut-off portion for mold disengagement purposes.

5. The linear motion guide device according to claim 1, wherein said ball chain includes two non-linear end portions.

6. The linear motion guide device according to claim 1 further comprising a track rail, a housing slidably engaged onto said track rail and including at least one bar extended therefrom and located beside said track rail, a frame attached onto said at least one bar for retaining said ball chain, said frame including two ends, two casings attached to said housing and disposed beside said ends of said frame, and a guide beam secured onto said housing and having two curved end portions.

7. The linear motion guide device according to claim 1 further comprising a board attached onto said frame for reinforcing purposes.

* * * * *